(12) United States Patent
Kress

(10) Patent No.: US 6,692,198 B2
(45) Date of Patent: Feb. 17, 2004

(54) TOOL FOR THE FINE MACHINING OF WORKPIECES

(75) Inventor: Dieter Kress, Aalen (DE)

(73) Assignee: Mapal Fabrik für Präzisionswerkzeug Dr. Kress KG (DE)

( * ) Notice: Subject to any disclaimer, the term of this patent is extended or adjusted under 35 U.S.C. 154(b) by 0 days.

(21) Appl. No.: 10/006,016

(22) Filed: Dec. 5, 2001

(65) Prior Publication Data

US 2002/0081168 A1 Jun. 27, 2002

(30) Foreign Application Priority Data

Dec. 5, 2000 (DE) .......................................... 100 60 283
Feb. 27, 2001 (DE) ...................................... 201 03 921 U

(51) Int. Cl.⁷ .............................. B23C 5/24; B26D 1/12
(52) U.S. Cl. ............................................ 407/36; 407/44
(58) Field of Search ............................... 407/36, 37, 38, 407/39, 41, 42, 44, 45, 47

(56) References Cited

U.S. PATENT DOCUMENTS

| 3,195,376 A | 7/1965 | Bader |
| 3,339,257 A | 9/1967 | Hargreaves et al. |
| 3,662,444 A | 5/1972 | Erkfritz |
| 3,802,043 A | 4/1974 | Garih ........................... 29/105 |
| 5,120,166 A | * 6/1992 | Woerner ....................... 407/12 |
| 5,211,516 A | * 5/1993 | Kress et al. .................... 407/41 |
| 5,217,330 A | 6/1993 | Dennstedt ...................... 407/37 |
| 6,155,753 A | 12/2000 | Chang |

FOREIGN PATENT DOCUMENTS

| DE | 2806079 B1 | 3/1979 | |
| DE | 4403188 A1 | 8/1995 | |
| DE | 19521599 | 12/1996 | ........................ 29/2 |
| DE | 19725219 | 12/1998 | ........................ 5/24 |
| EP | 0 332 596 B1 | 9/1989 | |
| JP | 10277839 | 10/1998 | |
| WO | WO 97/34722 | 9/1997 | |

* cited by examiner

*Primary Examiner*—Willmon Fridie, Jr.
(74) *Attorney, Agent, or Firm*—Ostrolenk, Faber, Gerb & Soffen, LLP

(57) ABSTRACT

A tool for the fine machining of workpieces having at least one cutter tip and at least one setting device acting on the cutter tip. The setting device comprises an adjusting element extending over a region of one side face of the cutter tip. A set screw displaces the adjusting element relative to the cutter tip at least one radially and axially with respect to the body. This moves the cutter tip at least one of radially and axially with respect to the body of the tool. A second adjusting element operably by a second setting device may be provided to act on a second side face of the cutter tip.

17 Claims, 4 Drawing Sheets

TOOL FOR THE FINE MACHINING OF WORKPIECES

BACKGROUND OF THE INVENTION

The present invention relates to a tool for the fine machining of workpieces, including a cutter tip at the front end of the tool, which tip is adjustable to position its cutting edge.

Tools of this type are known. They have at least one cutter tip, which removes chips from the workpiece by a relative movement between the tool or the cutting edge of the cutter tip and the workpiece. The tool is usually rotated to machine a stationary workpiece. The at least one cutter tip can be displaced by means of a setting device. It has been found that, in the process, precise orientation of the cutter tip cannot be realized or can only be realized with considerable effort.

SUMMARY OF THE INVENTION

The object of the invention is to provide a tool which does not have this disadvantage.

To achieve this object, a tool is proposed which enables the cutting edge of its cutter tip to be shifted at least one of radially and axially with respect to the body of the tool by one or by two independent setting devices. This tool includes a setting device which comprises an adjusting element. The adjusting element extends over a region of a side face of the cutter tip and bears against the tip. Point-like contact between the setting device and the cutter tip is thus avoided. At the same time, because the adjusting element extends over a region of the side face of the cutter tip, exact positioning of the cutter tip is possible.

A preferred exemplary embodiment of the tool distinguished by the fact that the adjusting element has an adjusting surface which comprises two bearing surfaces arranged at a distance from one another. In other words, the adjusting surface has an interruption in order to realize two contact regions, arranged at a distance from one another, between the cutter tip and the adjusting element.

An especially preferred embodiment of the tool is distinguished by the fact that the setting device has two adjusting elements which act on different side faces of the cutter tip and thus permits different setting directions.

BRIEF DESCRIPTION OF THE DRAWINGS

The invention is explained in detail below with reference to the drawings in which:

FIG. 5a–5e show several views of an adjusting element including:

FIG. 5a showing a set screw;

FIG. 5b showing a side view of an adjusting element;

FIG. 5c showing a front view of the adjusting element;

FIG. 5d showing another side view; and

FIG. 5e showing a plan view;

DESCRIPTION OF THE PREFERRED EMBODIMENTS

Figure 1:
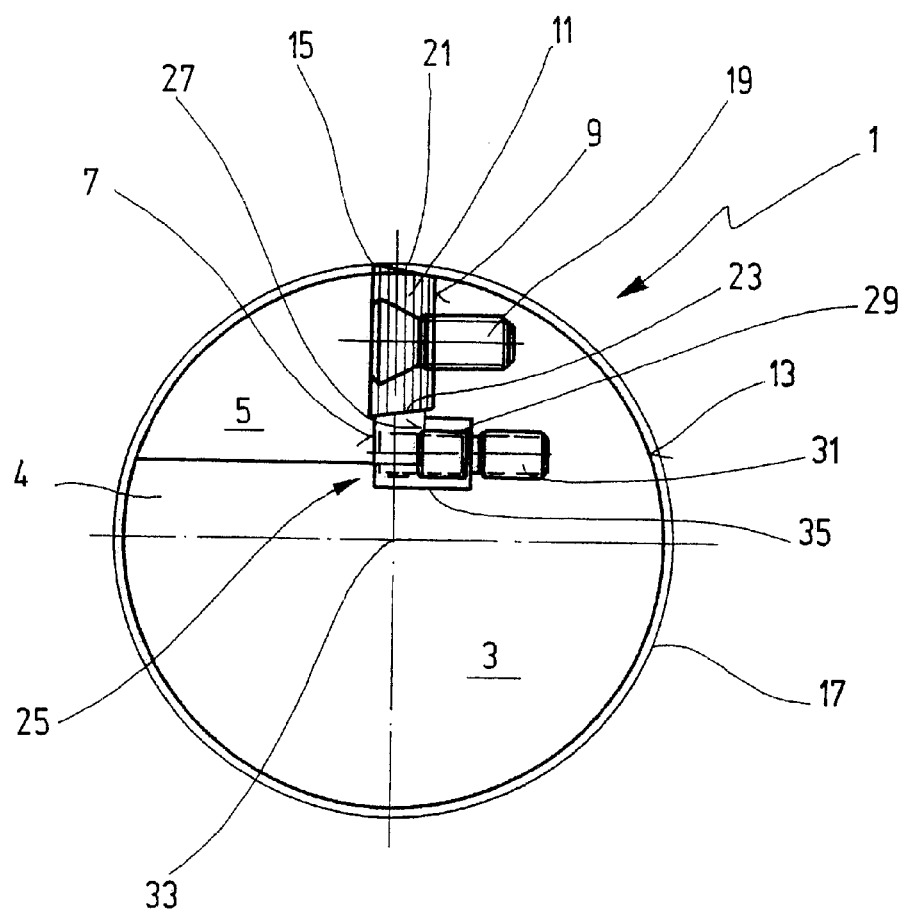
FIG. 1 is a diagrammatic view of a tool in front view.

The diagrammatic view of FIG. 1 shows a tool 1 in front view, showing the front end 3 of the tool. Here, the base body 4 of the tool 1 is essentially cylindrical, for example. It includes a recess 9 which extends in the longitudinal direction of the tool 1 and serves as chip space 5. The recess 9 is formed in a boundary surface 7 of the chip space 5 to receive an inserted cutter tip 11. An outer edge of the cutter tip 11 projects beyond the peripheral surface 13 and serves as a cutting edge 15 and to remove chips from a workpiece. For example, the tool 1 serves for the fine machining of a bore surface 17, indicated by a circle, in a workpiece.

Figure 2:
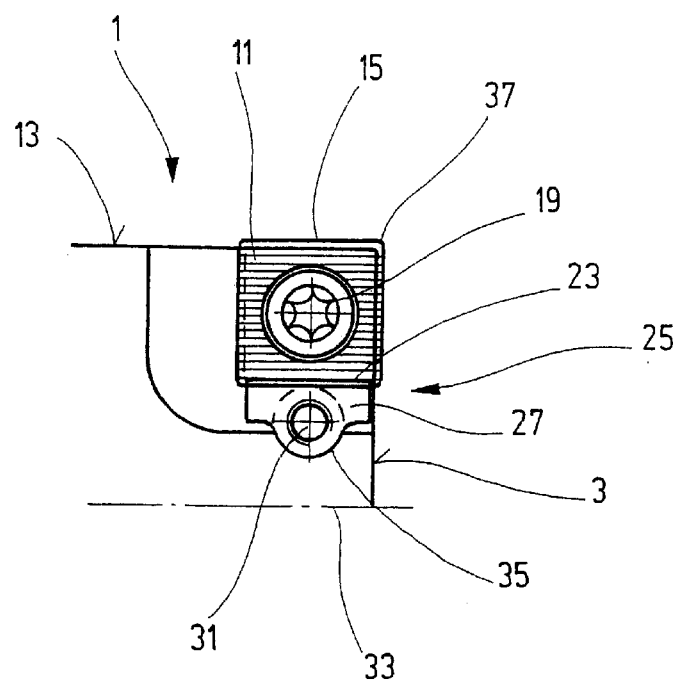
FIG. 2 is a detail of the tool in side view.

In this embodiment, the cutter tip 11 is fastened to the base body 4 of the tool 1 by a clamping screw 19, which passes through the cutter tip 11 and holds the tip securely by a screw head. It is also possible to fasten the cutter tip 11 to the base body of the tool 1 by a conventional clamping shoe. FIG. 2 shows the cutter tip 11 in side view. The top and bottom side faces 21 and 23, respectively, run conically toward one another and enclose an acute angle with one another, which opens from right to left. As a result, a "positive" clearance angle is realized. The outer side face 21 falls away radially inward, from left to right starting from the cutting edge 15, and the bottom or inner side face 23 rises, radially outward, from left to right.

A setting device 25 comprising an adjusting element 27 interacts with the bottom side face 23. The adjusting element 27 includes an adjusting surface 29, which bears flat against the bottom side face 23 of the cutter tip 11 and falls away from right to left. The adjusting element 27 is displaceable relative to the cutter tip 11 by a set screw 31. The bottom side face 23 and the adjusting surface 29 virtually form a wedge mechanism. By displacement of the adjusting element 27 to the left, the cutter tip 11 is displaced radially outward relative to the rotational or center axis 33 of the tool 1.

The adjusting element 27 has a preferably cylindrical extension 35, which is accommodated in a corresponding recess in the base body 4 of the tool 1 to guide the adjusting element 27 in the tool 1.

In FIG. 1, the base body 4 of the tool 1 is shown partly cut away, so that the clamping screw 19, the extension 35 and the set screw 31 are seen. The set screw 31 is accommodated in a hole in the base body 4. That hole opens to the right, that is, it intersects the peripheral surface 13. This makes the set screw 31 freely accessible from the right. However, the chip space 5 may be so large that the set screw 31 is also accessible from the left via the chip space 5.

FIG. 2, in plan view, shows the front part of the tool 1, including the cutter tip 11 having the top longitudinal edge which forms the cutting edge 15. The right-hand top corner 37 is part of the cutting edge of the cutter tip 11. Here, for example, the cutter tip is designed essentially square. However, it may also, for example, be a parallelogram or a rhombus. The head of the clamping screw 19 passes through the cutter tip 11 and is anchored in the base body of the tool 1. The clamping screw 19 presses the full face of the cutter tip 11 against the base of the recess 9. The setting device 25 is seen, particularly the adjusting element 27, which extends over a region of the bottom side face 23 of the cutter tip 11. The adjusting element preferably extends over a substantial part of the side face of the cutter tip 11, particularly virtually over its entire width. The extension 35, which projects at the bottom beyond the adjusting element, is also seen in the plan view. Here, like the clamping screw 19, the set screw 31 extends perpendicularly to the plane of FIG. 2.

FIG. 2 shows that the setting device 25 comprises an adjusting element 27 which, during an appropriate displacement, displaces the cutter tip 11 at an angle of 90° to the center axis 33. The machining radius of the tool 1, that is the extent of the projection of the cutting edge 15 relative to the peripheral surface 13, can thus be set.

FIG. 2 also shows that the cutter tip 11 projects relative to the front end 3. This embodiment moves the cutter tip at least one of radially and axially of the body 4 and here radially.

Figure 3:
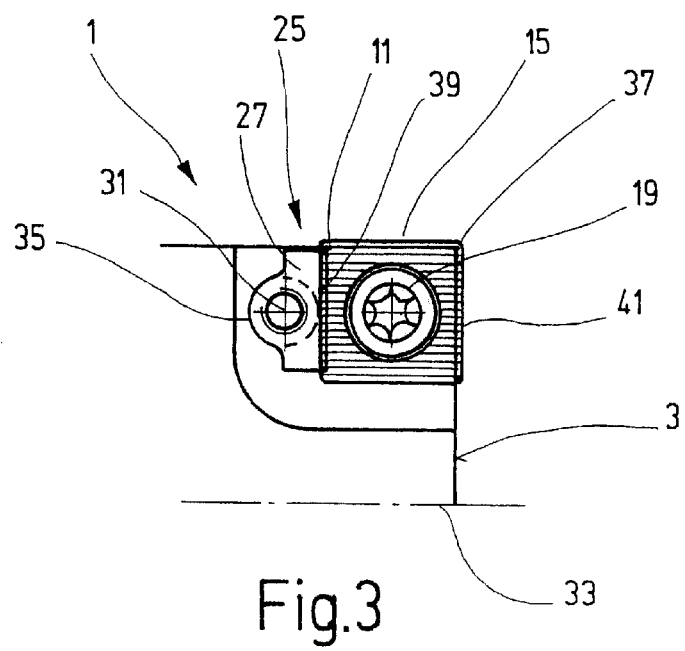
FIG. 3 is a first modified form of the tool shown in FIG. 2.

FIG. 3 shows a first modified form of the tool 1. The same elements as in FIGS. 1 and 2 are provided with the same reference numerals.

The embodiment in FIG. 3 differs from that shown in FIG. 2 by the fact that the setting device 25 is not arranged between the cutter tip 11 and the center axis 33 of the tool 1 but instead is at the inner side face 39 of the cutter tip 11. The side face 39 runs essentially perpendicularly to the center axis 33 and parallel to the outer side face 41, which projects beyond the front end 3 of the tool 1.

In the arrangement of the setting device 25 and of the associated adjusting element 27 in FIG. 3, axial displacement of the cutter tip 11 is achieved by the set screw 31, so that the outer side face 41 of the tip projects slightly beyond the front end 3 of the tool 1. This embodiment moves the cutter tip at least one of radially and axially of the body 4 and here axially.

Figure 4:
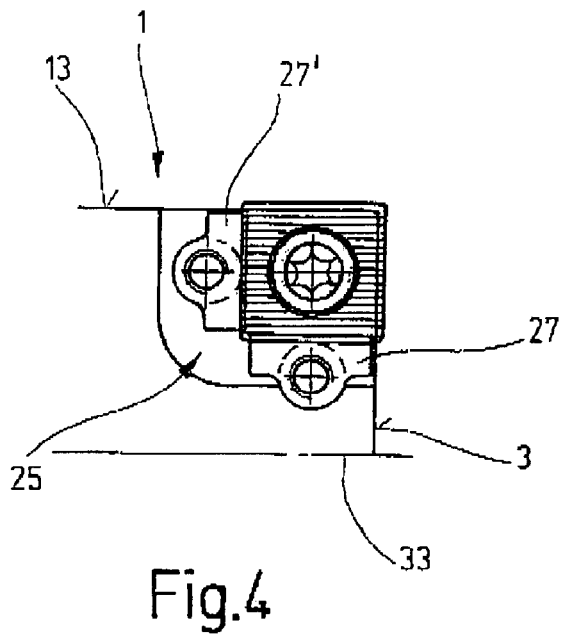
FIG. 4 is a further modified form of the tool shown in FIG. 2.

The modified embodiment of the tool 1 shown in FIG. 4 is distinguished by the setting device 25 having two adjusting elements 27 and 27'. The first adjusting element, as explained with reference to FIG. 2, runs between cutter tip 11 and center axis 33 of the tool. The second adjusting element 27', as explained with reference to FIG. 3, running at a distance from the front end 3 perpendicularly to the center axis 33. This makes it possible to set the projection of the cutter tip beyond both the peripheral surface 13 and the front end 3, that is with respect to both the radius and the length of the tool. Hence, the setting device may move the cutter tip at least one of radially and axially with respect to the body, or in this embodiment both simultaneously.

FIG. 5 shows one exemplary adjusting element 27 of the setting device 25, in various views, and also shows the set screw 31. At FIG. 5a, the set screw 31 is shown in side view on the extreme left. The set screw 31 is a "differential screw" which has two separate regions with different external threads. For example, the left-hand region 43 is right-handed thread and the right-hand region 45 is left-handed thread. These threaded regions may of course also be transposed. But the threaded regions have opposite orientation.

Figure 5E:
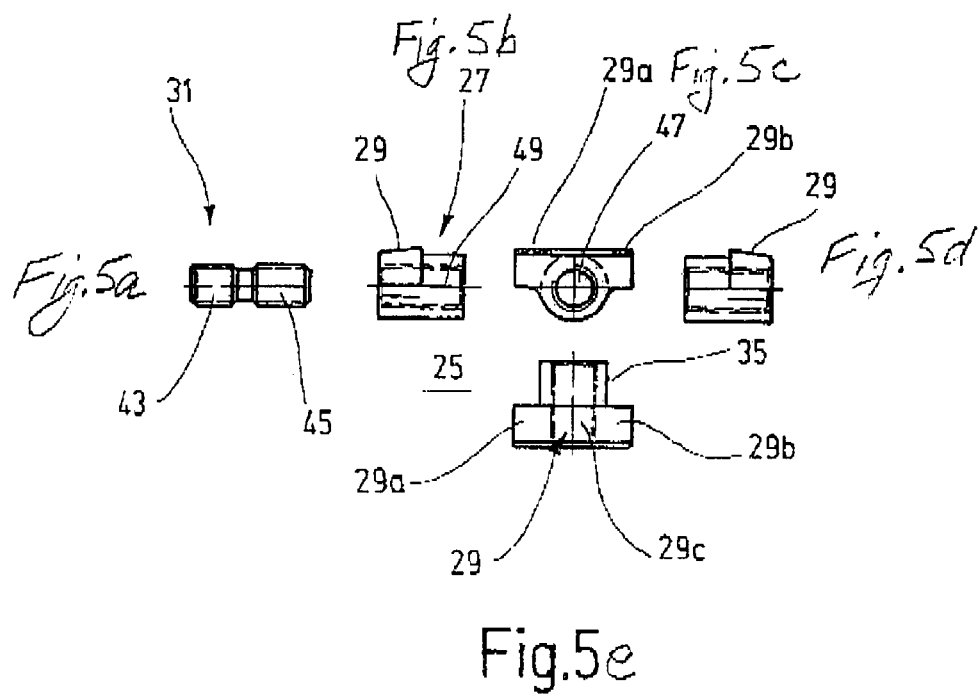

FIG. 5b shows an adjusting element 27 in side view, as in FIG. 1. The adjusting element 27 is again shown in front view in FIG. 5c, as in FIGS. 2 and 4. In FIG. 5d, the adjusting element 27 is shown in left side view. In FIG. 5e, the adjusting element 27 is shown in plan view, and the adjusting surface 29 can also be seen in plan view. The cylindrical extension 35, which guides the element 27 in the base body of the tool 1, can be seen. The hole 47 which receives the set screw 31 passes through the extension 35.

FIGS. 5b and 5d show that the adjusting surface 29 is inclined relative to the horizontal center plane 47, indicated by a line, of the adjusting element 27. The angle of inclination of the adjusting surface 29 is matched to the angle of inclination of that side face of the cutter tip 11 against which the adjusting element 27 bears.

In an especially preferred embodiment, the adjusting surface 29 has two bearing surfaces 29a and 29b which lie at a distance from one another. The intermediate region 29c is sunk or depressed relative to the adjacent surfaces 29a and 29b, so that the adjusting element 27 does not touch the associated side face of the cutter tip 11 here. This configuration ensures that the adjusting element 27 bears flat against the associated side faces of the cutter tip 11, ensuring support of the cutter tip 11 over a relatively large area by means of the setting element 25. In particular, approximately point-like contact like a set screw, which is used conventionally, is avoided.

Figure 6:
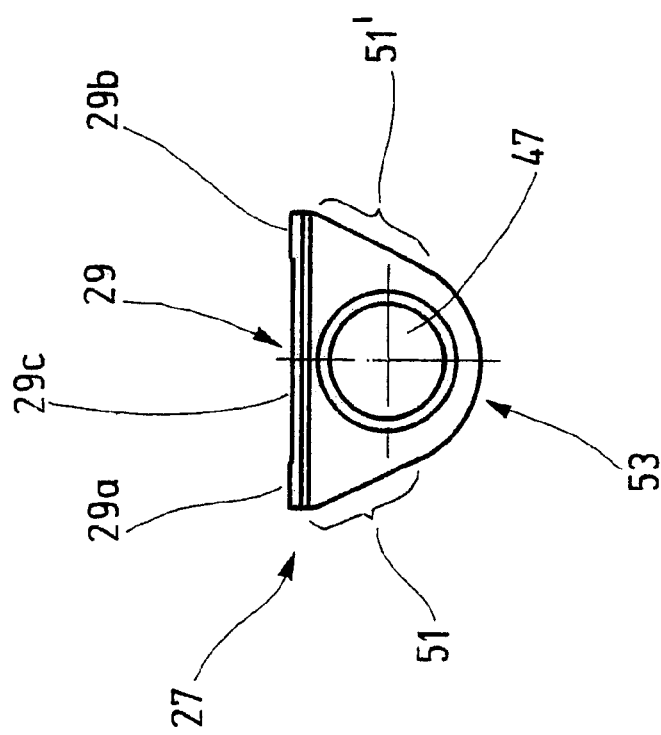
FIG. 6 is a plan view of a modified embodiment of the adjusting element.

FIG. 6 shows a modified exemplary of an adjusting element 27 in plan view. Corresponding parts have the same reference numerals, as in FIGS. 1 to 5. This adjusting element 27 has an adjusting surface 29 which, as in FIG. 5, has two bearing surfaces 29a and 29b arranged at a distance from one another and has an intermediate sunken region 29c, which does not touch the associated side face of a cutter tip 11 when the adjusting element is being used. A hole 47 passes through the adjusting element 27, into which a clamping screw (not shown here) can be inserted.

The embodiment of the adjusting element 27 in FIG. 6 is distinguished by the fact that wall regions laterally adjoining the adjusting surface 29 are oriented to define a V-shape, which opens from top to bottom in the direction of the adjusting surface 29 which the walls adjoin and intersect. This produces two opposite inclined contact surfaces 51 and 51' of a length defined by the rounded off bottom region 53 or apex opposite the adjusting surface 29. The contact surfaces 51 and 51' are rectilinear sections extending between the region 53 and the adjusting surface 29 of the side wall of the adjusting element 27.

The region 53 connecting the two contact surfaces 51, 51' is curved with an outer contour that preferably follows an arc of a circle. The radius of that arc is preferably larger than that of the recess in the base body 4 of the tool 1, into which recess the adjusting element 27 is inserted. This ensures that the adjusting element 27 touches the base body 4 of the tool 1 merely in the regions of the contact surfaces 51, 51'.

Exact angular orientation of the adjusting element 27 and thus of the adjusting surface 29 is obtained by the V-shaped contact surfaces 51, 51', which interact with corresponding bearing surfaces in the base body 4 of the tool 1. This exact orientation enables the cutter tip 11 that interacts with the adjusting element 27 to be oriented exactly and thus enables, for example, the desired slope of a secondary cutting edge, which slopes down from the front edge of a cutter tip 11 (see FIG. 2, for example) to the left, to be ensured.

Figure 7:
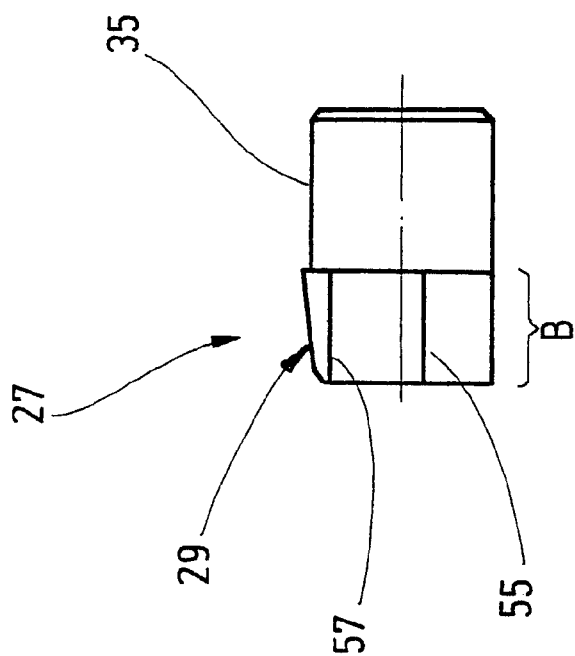
FIG. 7 is a side view of the adjusting element shown in FIG. 6.

The side view of the adjusting element 27 of FIG. 6, which is shown in FIG. 7, shows that it is designed essentially like the adjusting element of FIGS. 1 to 5. FIG. 7 shows the axial direction width B of the contact surfaces 51, 51'. A first line 55 indicates how far the contact surfaces 51, 51' extend downward. A second line 57 indicates that the contact surfaces 51, 51' need not extend fully up to the adjusting surface 29.

The adjusting element 27 of FIGS. 6 and 7 is distinguished by the fact that both the adjusting element 27 and the adjusting surface 29 are exactly oriented by the V-shaped or prismatic orientation of the contact surfaces 51, 51'.

Adjusting elements as in FIGS. 6 and 7 may be used individually, as described with reference to FIGS. 2 and 3. However, it is also possible to use two such adjusting elements, as explained with reference to FIG. 4.

It is especially advantageous that the setting device 25 in FIGS. 1–4 is of very simple construction and that the inclination of the side faces of the cutter tip 11, which is provided for by the positive clearance angle, is utilized for forming a wedge mechanism. It is thus possible in a simple manner to displace the cutter tip 11 in the direction of the center axis 33 and/or at an angle to the axis by displacing the first adjusting element 27 and/or the second adjusting element 27'.

In practice, the size of the adjustment is relatively small and it essentially is to compensate for tolerances in the manufacture of the cutter tip 11 and/or of the recess 9 that receives the cutter tip. In addition, any clearance possibly still present between the clamping screw 19 and the cutter tip 11 can be compensated for by means of the setting devices described here. In particular, a settling movement of the cutter tip, that is a displacement of the cutter tip 11 during the initial use of the tool 1, can be reliably avoided in a simple manner.

From the explanations of FIGS. 1 to 7, it can be seen that the setting device may also be used in tools which have a plurality of cutter tips. The setting device 25 may compensate for dimensional differences between the various cutter tips and which exist in the respective cutting edge 15 of a cutter tip 11.

Finally, the setting device 25 described here may also be used together with tools whose outer contour is not cylindrical, or at least not continuously cylindrical. In all cases, the device ensures that the setting of the cutter tip and its positioning can be optimally predetermined, so that dimensional specifications can be exactly adhered to during the fine machining.

When the set screw 31 is turned in the one direction of rotation, the adjusting element 27 is displaced and, on account of the wedge-shaped contact between the adjusting element 27 and the cutter tip 11, the cutter tip 11 is displaced radially outward, during which the clamping screw 19 holding the cutter tip 11 is elastically deformed. During the setting, if the set screw 31 is turned in the other rotation direction, the adjusting element 27 is displaced in the other direction. On account of the wedge-shaped contact with the cutter tip 11, the tip is moved back into the position directed radially inward. This movement is enabled due to the elastic deformation of the clamping screw 19 because the existing prestress is reduced again as a function of the size of the displacement of the adjusting element 27. It is therefore not necessary to knock the cutter tip 11 inward with a tool. Instead, this return displacement is effected automatically as a function of the setting of the set screw 31.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A tool for fine machining of work pieces, wherein the tool comprises:
   a body having a forward end;
   a cutter tip disposed at the forward end of the body, the cutter tip including a cutter edge, the cutter tip being moveable with respect to the body at least one of radially with respect to the axis of the body and axially along the axis of the body for correspondingly adjusting the position of the cutting edge of the cutter tip with respect to the body, the cutter tip having a side face;
   a setting device on the body for cooperating with the cutter tip for moving the cutter tip;
   the setting device comprising an adjusting element that extends over a region of the side face of the cutter tip and is contactable with the side face; a displacing element connected with the adjusting element for displacing the adjusting element relative to the cutter tip and to the body for moving the cutter tip and the cutting edge thereof, at least one of radially with respect to the axis of the body and axially with respect to the axis of the body;
   wherein the adjusting element has a respective adjusting surface that engages and interacts with and is so shaped with respect to the side face of the cutter tip that movement of the adjusting element and the adjusting surface moves the cutter tip at least one of axially and radially with respect to the axis of the body; and
   wherein the adjusting surface of the adjusting element has first and second bearing surfaces thereon which are spaced at a distance from one another with an intermediate region therebetween, and arranged so that the side face of the cutter tip is engaged by said first and second bearing surfaces but not by said intermediate region.

2. A tool for fine machining of work pieces, wherein the tool comprises:
   a body having a forward end;
   a cutter tip disposed at the forward end of the body, the cutter tip including a cutter edge, the cutter tip being moveable with respect to the body at least one of radially with respect to the axis of the body and axially along the axis of the body for correspondingly adjusting the position of the cutting edge of the cutter tip with respect to the body, the cutter tip having a side face;
   a setting device on the body for cooperating with the cutter tip for moving the cutter tip;
   the setting device comprising an adjusting element that extends over a region of the side face of the cutter tip and is contactable with the side face; a displacing element connected with the adjusting element for displacing the adjusting element relative to the cutter tip and to the body for moving the cutter tip and the cutting edge thereof, at least one of radially with respect to the axis of the body and axially with respect to the axis of the body;
   wherein the adjusting element has a respective adjusting surface that engages and interacts with and is so shaped with respect to the side face of the cutter tip that movement of the adjusting element and the adjusting surface moves the cutter tip at least one of axially and radially with respect to the axis of the body; and
   wherein the side face of the cutter tip has first and second bearing surfaces thereon which are spaced at a distance from one another over the side face, and the adjusting surface of the adjustment element engages the first and second bearing surfaces, without engaging an intermediate region of said side face between the first and second bearing surfaces.

3. The tool of claim 1, wherein the displacing element comprises a set screw supported in the body and received in the adjusting element, the set screw being operable for displacing the adjusting element.

4. The tool of claim 1, wherein the adjusting element has wall regions that intersect and also adjoin the adjusting surface, and the wall regions together define a generally V-shape for the adjusting element.

5. The tool of claim 1, wherein the adjusting element includes walls that intersect and also adjoin the adjusting surface and the wall regions are oriented as to define a generally V-shape with an apex opposite the adjusting surface, each of the wall regions having a respective contact surface therealong extending in a direction from the adjusting surface to the apex of the V-shape.

6. The tool of claim 5, wherein the contact surfaces merge into the apex, and the apex is a curved region.

7. The tool of claim 6, wherein the apex is curved in the shape of an arc of a circle.

8. The tool of claim 7, wherein the arc of the apex has a first radius of curvature, the body has a recess at the forward end thereof for receiving the adjusting element and the adjusting element radius of curvature is larger than the recess in the body which receives the adjusting element.

9. The tool of claim 1, wherein the adjusting element includes a cylindrical extension thereof extending along the direction of the axis of the body and located in the adjusting element away from the adjusting surface.

10. The tool of claim 1, wherein the cutter tip has a second side face oriented to intersect the side face of the cutter tip; a second adjusting element having a second adjusting surface disposed at the second side face of the cutter tip and the second adjusting element being independently displaceable with respect to the cutter tip from the adjusting element, displacement of the second adjusting element causes cooperation between the second adjusting surface and the second side face for moving the cutter tip in the other of the direction radially of the axis of the body and axially of the axis of the body.

11. The tool of claim 10, wherein the displacing element for displacing the adjusting element comprises a set screw supported in the body and received in the adjusting element and operable for displacing the adjusting element; the set screw extending through the cylindrical extension of the adjusting element.

12. The tool of claim 1, wherein the cooperation between the cutter tip and the adjusting element through movement of the adjusting element displaces the cutter tip along the direction of the axis of the tool.

13. The tool of claim 1, wherein the cooperation between the cutter tip and the adjusting element through movement of the adjusting element displaces the cutter tip at an angle with respect to the axis of the body, causing the cutting edge of the cutter tip to move radially.

14. The tool of claim 1, further comprising a clamping screw passing through the cutter tip and into the body for fixing the cutter tip to the body.

15. The tool of claim 14, wherein the clamping screw is elastically deformable transversely to its longitudinal extent by displacement of the adjustment element through which the clamping screw extends, wherein as the clamping screw is deformed, the clamping screw applies a restoring force to restore the position of the adjusting element.

16. The tool of claim 2, wherein the displacing element comprises a set screw supported in the body and received in the adjusting element, the set screw being operable for displacing the adjusting element.

17. Tool for the fine machining of workpieces with at least one cutter tip and with at least one setting device (25), which acts on the cutter tip; said setting device comprising an adjustment element (27;27') that extends over an area of a side surface of the cutter tip (11) and a displacing element (31) that moves the adjusting element relative to the cutter tip;

wherein the adjusting element (27; 27') has an adjusting surface (29), which interacts with the side surface of the cutter tip (11), and the adjusting surface (29) comprises two contact surfaces (29a, 29b) which interact with said side surface, said two contact surfaces (29a, 29b) having therebetween an intermediate region of said adjusting surface (29) which does not interact with said side surface.

* * * * *